(12) United States Patent
DeAngelo et al.

(10) Patent No.: US 10,759,674 B2
(45) Date of Patent: Sep. 1, 2020

(54) APPARATUS FOR FILTERING WATER

(71) Applicants: Regina DeAngelo, Charlestown, RI (US); William Scott Keeley, Charlestown, RI (US)

(72) Inventors: Regina DeAngelo, Charlestown, RI (US); William Scott Keeley, Charlestown, RI (US)

(*) Notice: Subject to any disclaimer, the term of this patent is extended or adjusted under 35 U.S.C. 154(b) by 0 days.

(21) Appl. No.: 16/043,956

(22) Filed: Jul. 24, 2018

(65) Prior Publication Data
US 2019/0031529 A1   Jan. 31, 2019

Related U.S. Application Data

(60) Provisional application No. 62/536,758, filed on Jul. 25, 2017.

(51) Int. Cl.
C02F 1/00     (2006.01)
C02F 1/28     (2006.01)
C02F 103/04   (2006.01)

(52) U.S. Cl.
CPC .............. *C02F 1/003* (2013.01); *C02F 1/283* (2013.01); *C02F 2103/04* (2013.01); *C02F 2201/006* (2013.01); *C02F 2307/04* (2013.01)

(58) Field of Classification Search
None
See application file for complete search history.

(56) References Cited

U.S. PATENT DOCUMENTS 5,652,008 A * 7/1997 Heiligman .............. C02F 1/003
                                                   210/263
2014/0151284 A1* 6/2014 Cur ........................ B01D 15/10
                                                   210/282
2014/0263020 A1* 9/2014 MacDonald ............ C02F 1/003
                                                   210/232

* cited by examiner

*Primary Examiner* — Bobby Ramdhanie
*Assistant Examiner* — Denise R. Anderson
(74) *Attorney, Agent, or Firm* — Keeley DeAngelo LLP; W Scott Keeley

(57) ABSTRACT

An apparatus for filtering water with a refillable, activated-charcoal receptacle or cartridge.

3 Claims, 10 Drawing Sheets

200

300

APPARATUS FOR FILTERING WATER

TECHNICAL FIELD

The present disclosure relates to water filters and cartridges for water filters.

BACKGROUND

Carbon filtering involves activated carbon for removing contaminants and impurities from water by chemical adsorption. Carbon granules have a pore structure and surface area that is conducive to exposure to active sites within the carbon. Filtration using activated carbon works by a process called adsorption whereby contaminants in a fluid become trapped inside the pore structure of carbon granules. Carbon filtering is commonly used for water purification, air purification and industrial gas processing. When used for water purification, active carbon, also referred to as activated charcoal, is most effective at removing chlorine, sediment and volatile organic compounds; and is less effective at removing minerals, salts and dissolved inorganic compounds.

Particles commonly removed by activated charcoal filters range from 0.5 to 50 micrometers in diameter. The efficacy of an activated charcoal is affected by the rate of flow through the charcoal particulate. The slower the rate at which water flows through a bed of charcoal particulate, the greater the rate of exposure of contaminants to filter media. Saturating a filter media also continues to allow exposure and adsorption of contaminants to filter media. Contaminants do not release back into a fluid once adsorbed by a carbon media unless heated above 100° C.

Activated charcoal provides an environment for microbes in soil that are beneficial to living plants. Since contaminants are not released from activated charcoal in ambient temperatures they tend to remain attached to the activated charcoal and not release into soil when used in compost.

Home use filters often use disposable filter cartridges that contain activated charcoal in a convenient container that allows water to flow through without allowing charcoal fragments to fall out of the container.

Plastic disposable items add to the waste stream and take a considerable time to break down. Even broken down, many plastics are toxic to the environment. Reusable plastic products, or products made from materials that occur naturally in the environment, reduce the size and toxicity of the waste stream.

SUMMARY

In accordance with example embodiments of the present disclosure, a refillable apparatus for filtering water is described. A refillable filter apparatus may be used to filter water until the activated charcoal is saturated with residue and contaminants. The resultant charcoal material may be used in compost.

A refillable cartridge allows the user to dispose of the used activated charcoal and replace it with clean activated charcoal without throwing away its container. In one embodiment, a container configured to engage with a serving vessel has a removable lid and contains granulated, activated charcoal. The container and removable lid have appropriate holes to allow water to flow through the container without allowing the granulated activated charcoal to fall through.

In another embodiment a conical frustum form has a screened bottom and top, the top being removable. The conical frustum form is filled with activated charcoal and the top is fastened closed. The conical frustum form may be placed over the opening of a vessel while water is poured through the screened top, thus flowing through the activated charcoal, through the bottom of the conical frustum and into the vessel.

One skilled in the art understands that although refillable cartridges may be manufactured of various materials including ceramic, stainless steel, and plastics, they may also be constructed of materials that occur naturally or materials that are not harmful to the environment. Ceramic materials have appropriate properties for containing granular substance and water as do carved stone, cast stone or concrete and even some reed-based materials. In one embodiment a reed-based, mesh fabric is used to contain activated charcoal particulate in a mesh pod. Activated charcoal-filled mesh pods are used to fill filter containers. When the activated charcoal has adsorbed a sufficient amount of contaminants, the mesh pod may be discarded and replaced.

Other objects and features will become apparent from the following detailed description considered in conjunction with the accompanying drawings. Drawings are designed to illustrate rather than define the limits of the invention.

BRIEF DESCRIPTION OF THE DRAWINGS

To assist those of skill in the art in making and using the disclosed invention and associated methods, reference is made to the accompanying figures, wherein example figure descriptions follow.

DESCRIPTION

Figure 1:
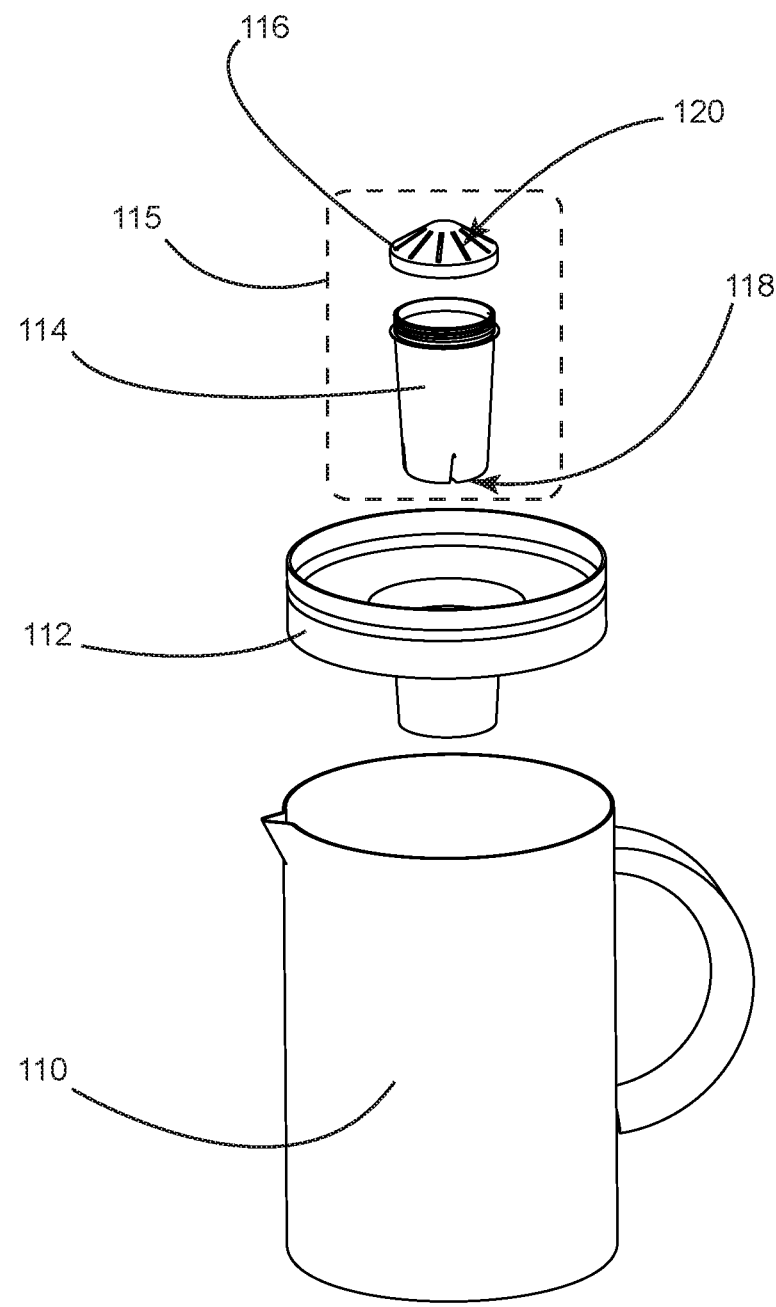
FIG. 1 is a perspective, exploded view of the present embodiment.
Figure 2:
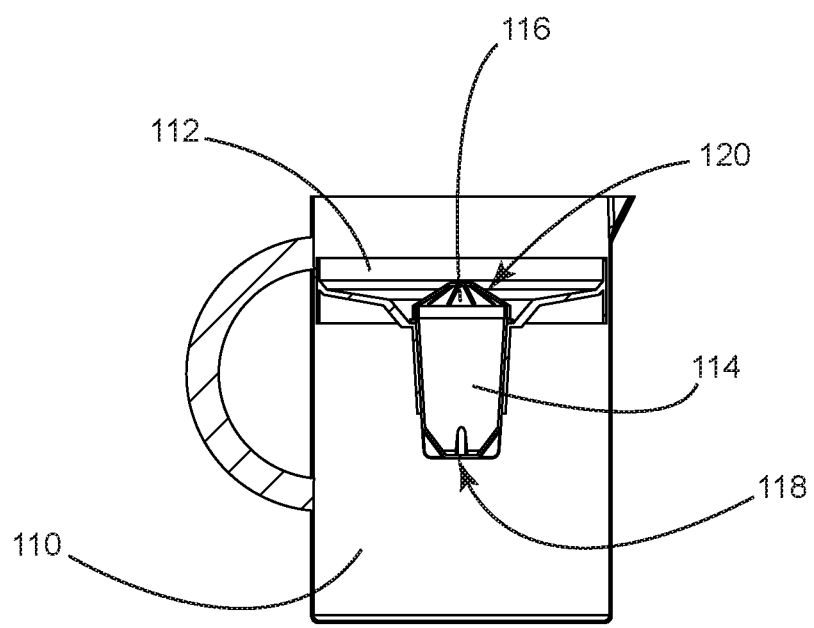
FIG. 2 is a section view of the embodiment of FIG. 1.

Referring to FIG. 1 and FIG. 2, an exploded, perspective view of the present embodiment and a cross section assembled view, respectively, are illustrated. A vessel 110 holds and dispenses filtered water. A funnel 112 is designed to fit atop or inside the upper opening of the vessel 110. Dashed lines surround the components of a cartridge 115 (FIG. 1) that is made up of a lower portion 114 and a cap 116 and is configured to be filled with granular activated charcoal. The cartridge cap FIGS. 1 and 2 116 has holes 120 that allow unfiltered water to enter the cartridge. The lower portion of the cartridge has holes 118 for allowing filtered water to pass out of the cartridge and into the vessel 110. Water poured into the funnel 112 passes through holes 120, through granular activated charcoal, and out holes 118 into the vessel 110.

Figure 3:
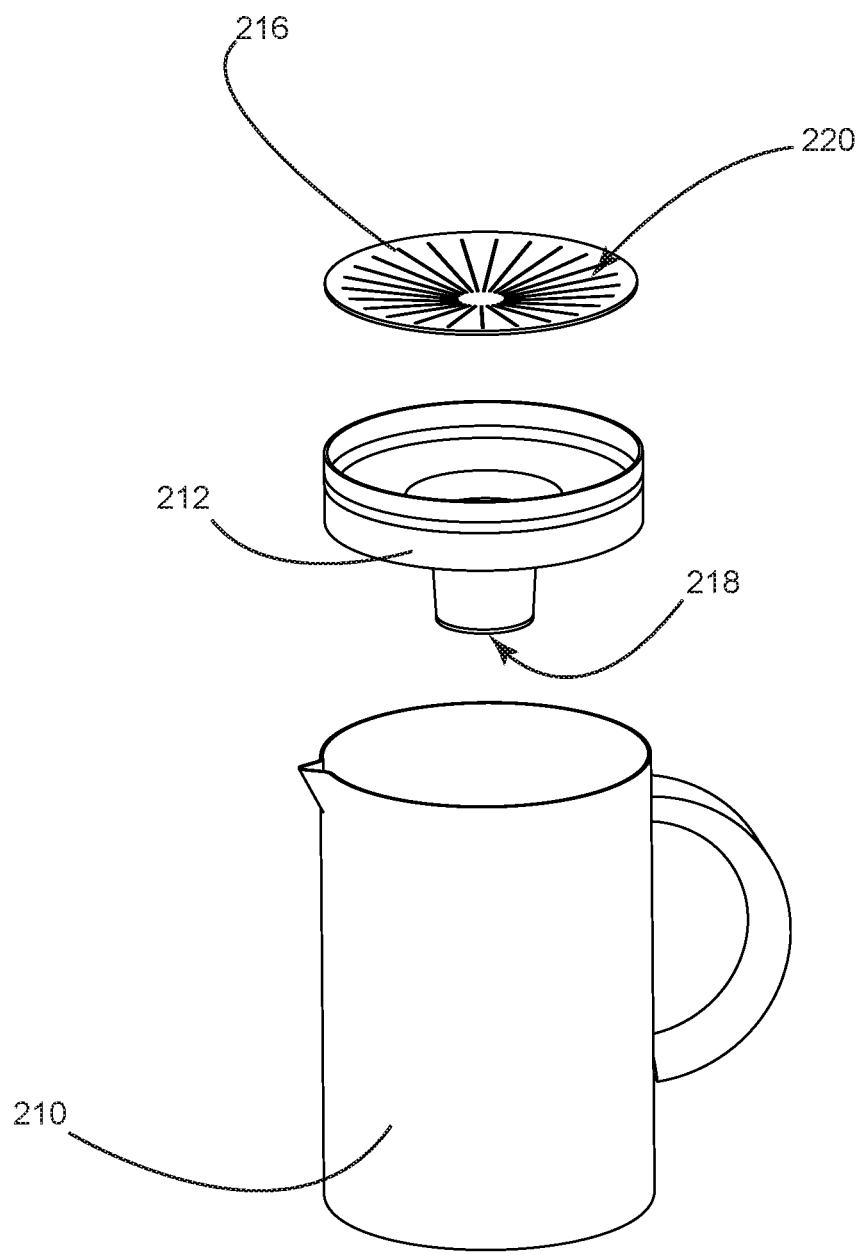
FIG. 3 is a perspective, exploded view of an iteration of the embodiment.
Figure 4:
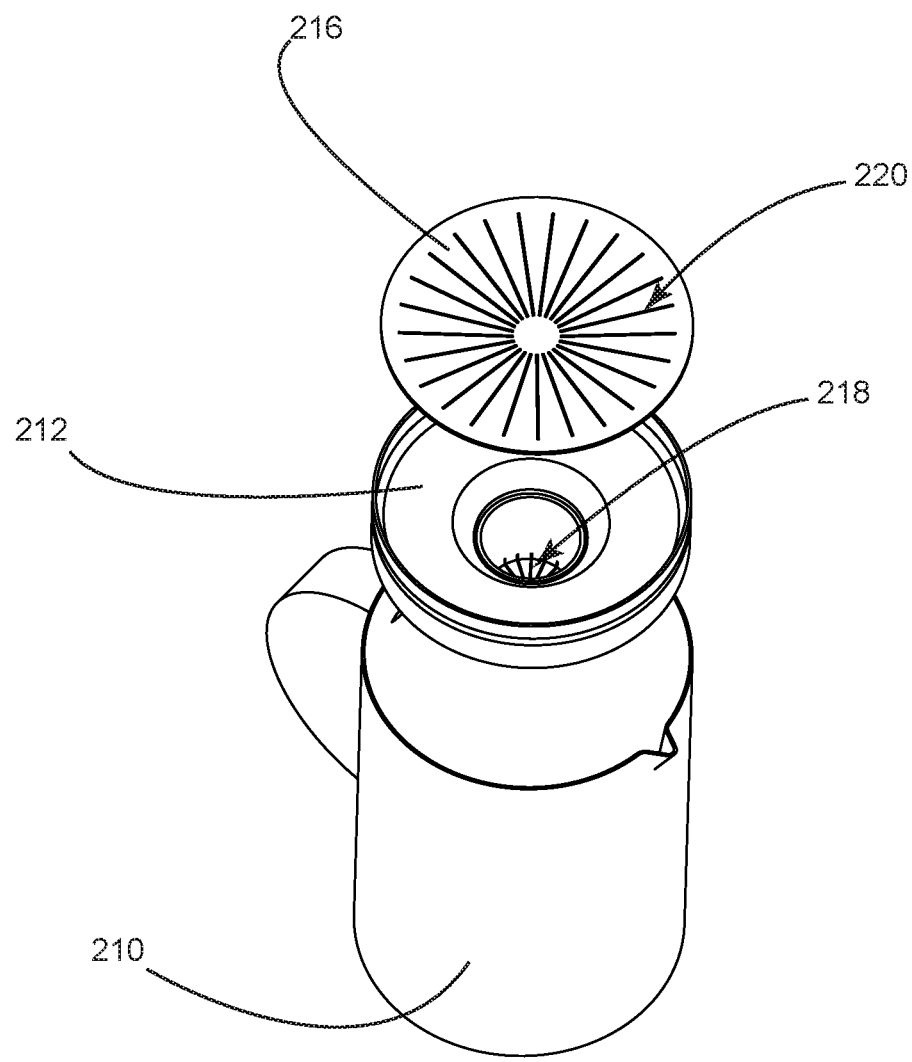
FIG. 4 is an exploded, perspective view of the embodiment of FIG. 3.
Figure 5:
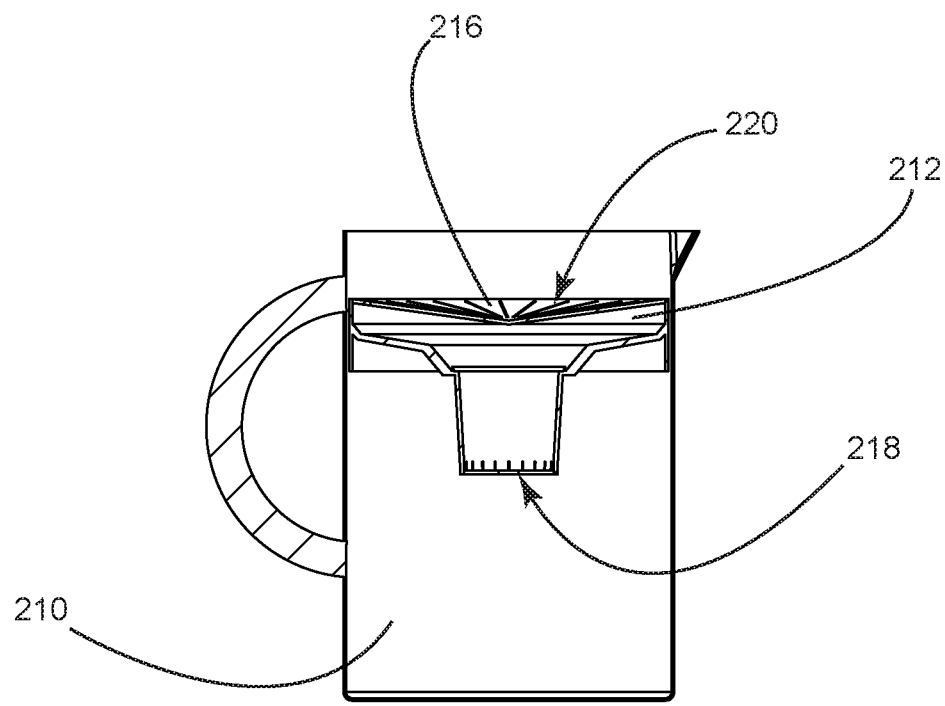
FIG. 5 is a section view of the embodiment of FIG. 3.

Referring to FIG. 3, FIG. 4 and FIG. 5, perspective, exploded views of an iteration of the embodiment are shown in FIG. 3 and FIG. 4, and a cross-section of the iteration of FIG. 3 and FIG. 4 is shown in FIG. 5. A vessel 210 holds filtered water for dispensing. A funnel 212 has a perforated bottom with holes 218. A cap 216 fits atop the funnel 212 with a water-tight seal. The cap 216 has holes 220 that are configured to allow water to flow through without allowing granular activated charcoal to pass through. Water poured into the funnel 212 passes through the holes 220 in the cap 216, through the activated charcoal contained in the funnel 212 and through the perforations 218 in the bottom of the funnel 212 and finally into the vessel 210 where the filtered water may be dispensed.

Figure 6:
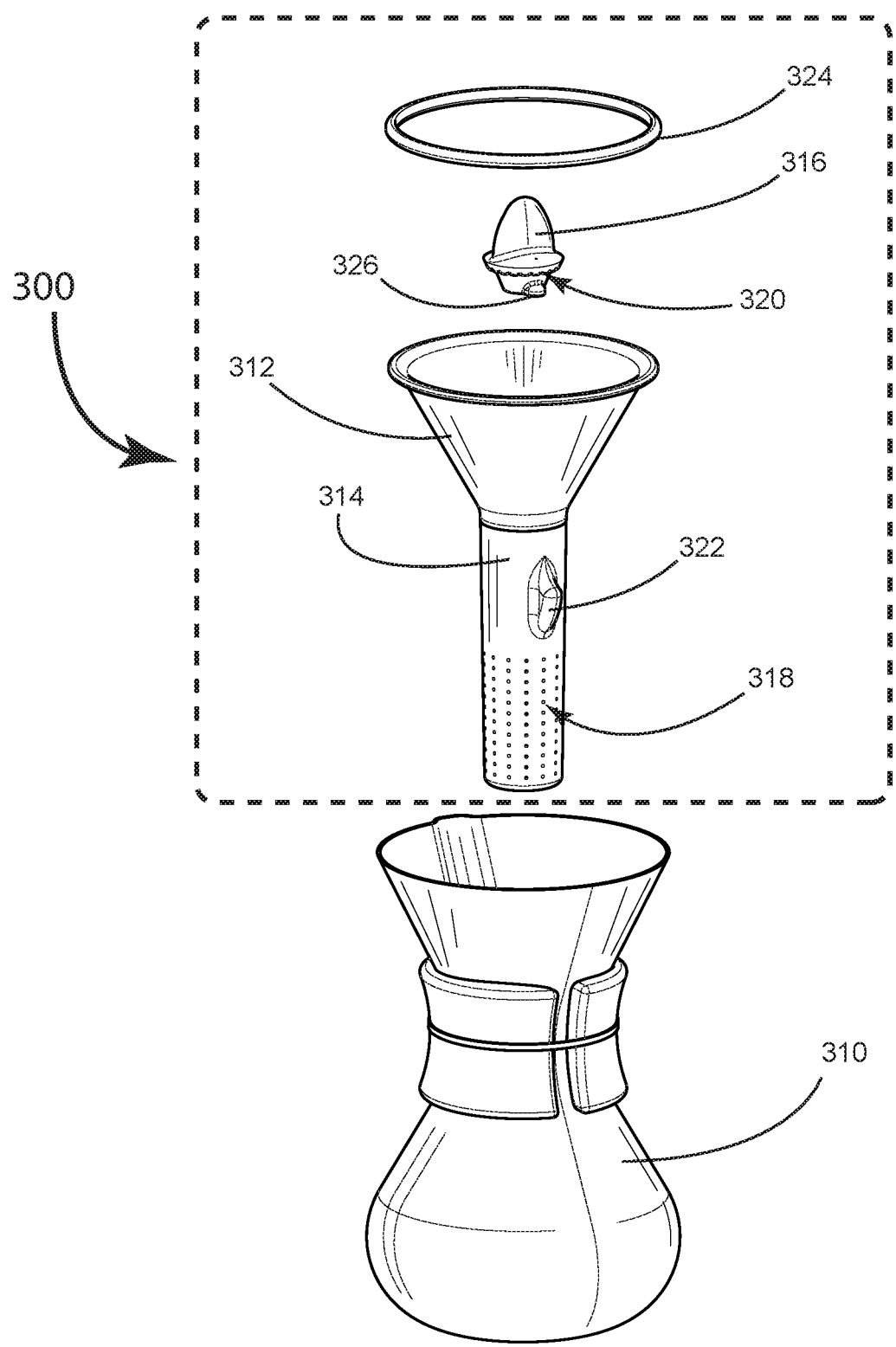
FIG. 6 is an exploded view of a third iteration of the embodiment shown with an example carafe.
Figure 7:
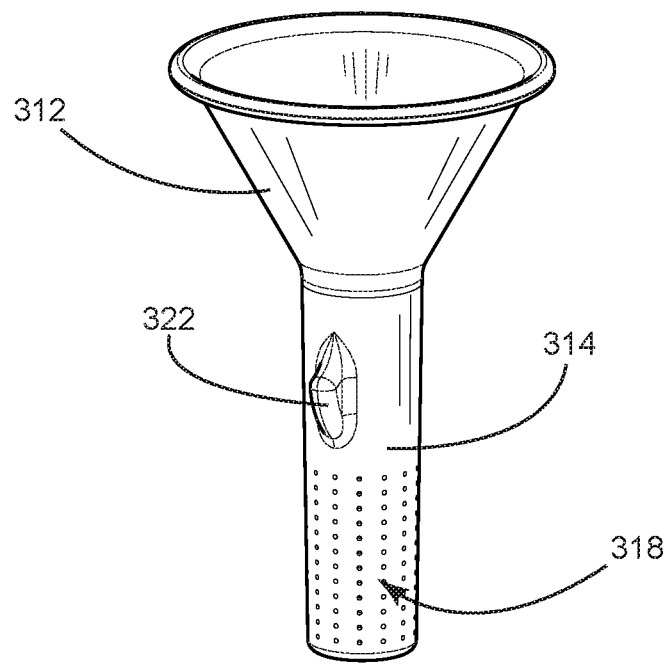
FIG. 7 is a perspective view of the embodiment of FIG. 6.
Figure 8:
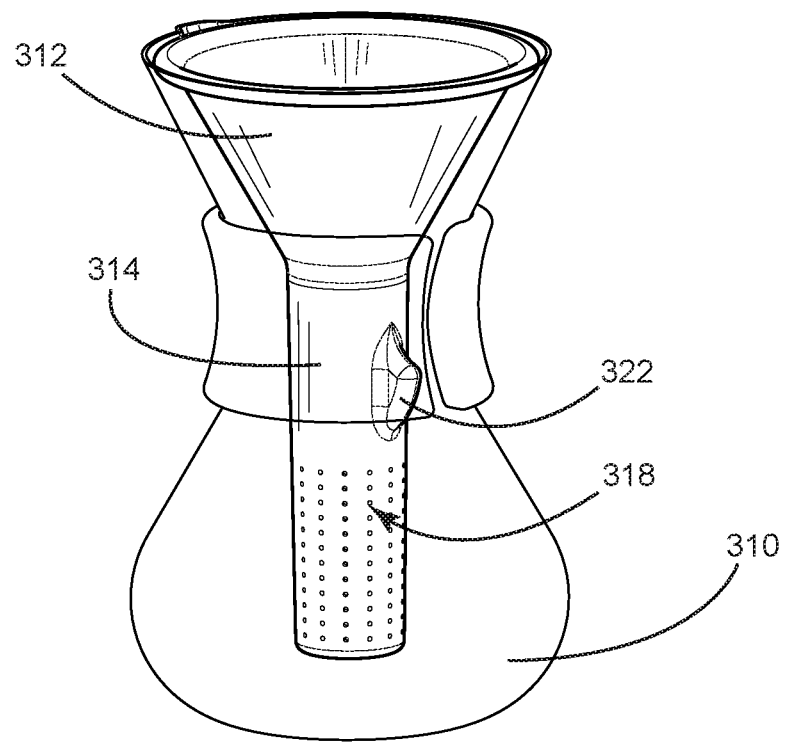
FIG. 8 is a perspective view of the embodiment of FIG. 6 shown with an example carafe.

Referring to FIG. 6, FIG. 7 and FIG. 8: FIG. 6 shows an exploded view of an iteration of the embodiment with a carafe; FIG. 7 shows a perspective view of the embodiment; and FIG. 8 shows a perspective view of the embodiment assembled with a carafe. The embodiment 300 is shown within the dashed lined box. An example carafe 310 is used to contain filtered water and to support the embodiment 300 and is not a claimed part of the embodiment. The embodiment comprises a frusto-conical section 312 that is fixedly engaged with a substantially cylindrical portion 314. The substantially cylindrical portion 314 is open at the top for water to flow into it. Its bottom surface has an array of holes 318 that allow water to permeate it. The cylindrical portion 314 has a protrusion 322 that creates interference when properly fitted into the carafe 310 and prevents the apparatus 300 from falling out of the carafe during pouring. Holes 318 in the cylindrical portion may penetrate the side walls as well as the bottom surface of the cylinder 314.

One skilled in the art understands that a sufficient number of holes is required for activated charcoal filtration, and that a substantial number of holes may, in addition, provide a vessel for infusing tea, or other infused beverages, in a carafe.

Figure 9:
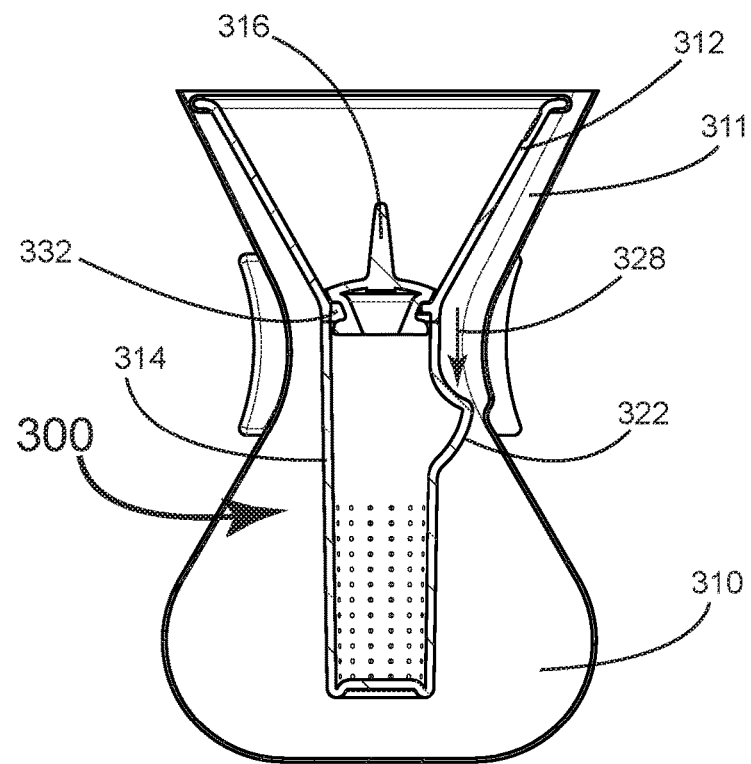
FIG. 9 is a section view of the embodiment of FIG. 6.
Figure 10:
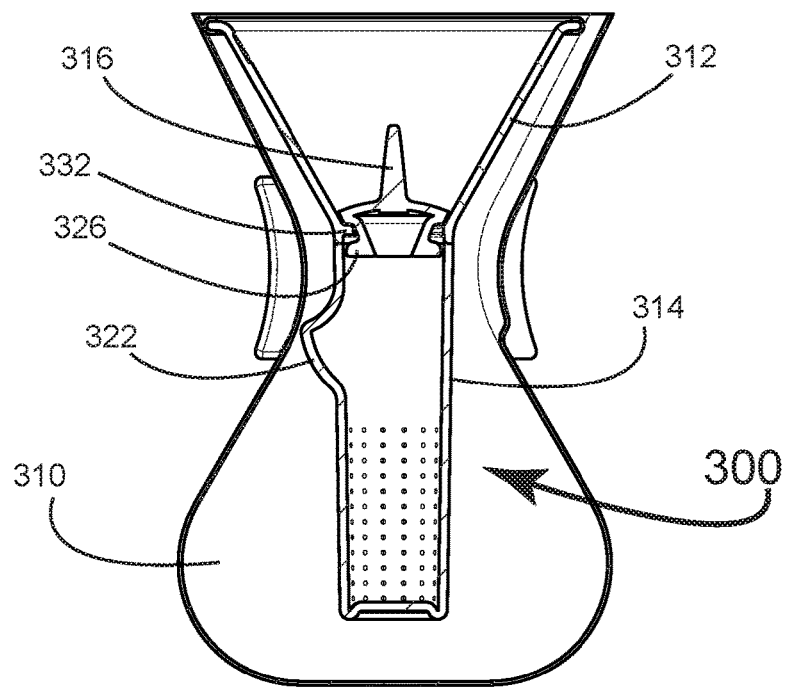
FIG. 10 is a section view of the embodiment of FIG. 6.
Figure 11:
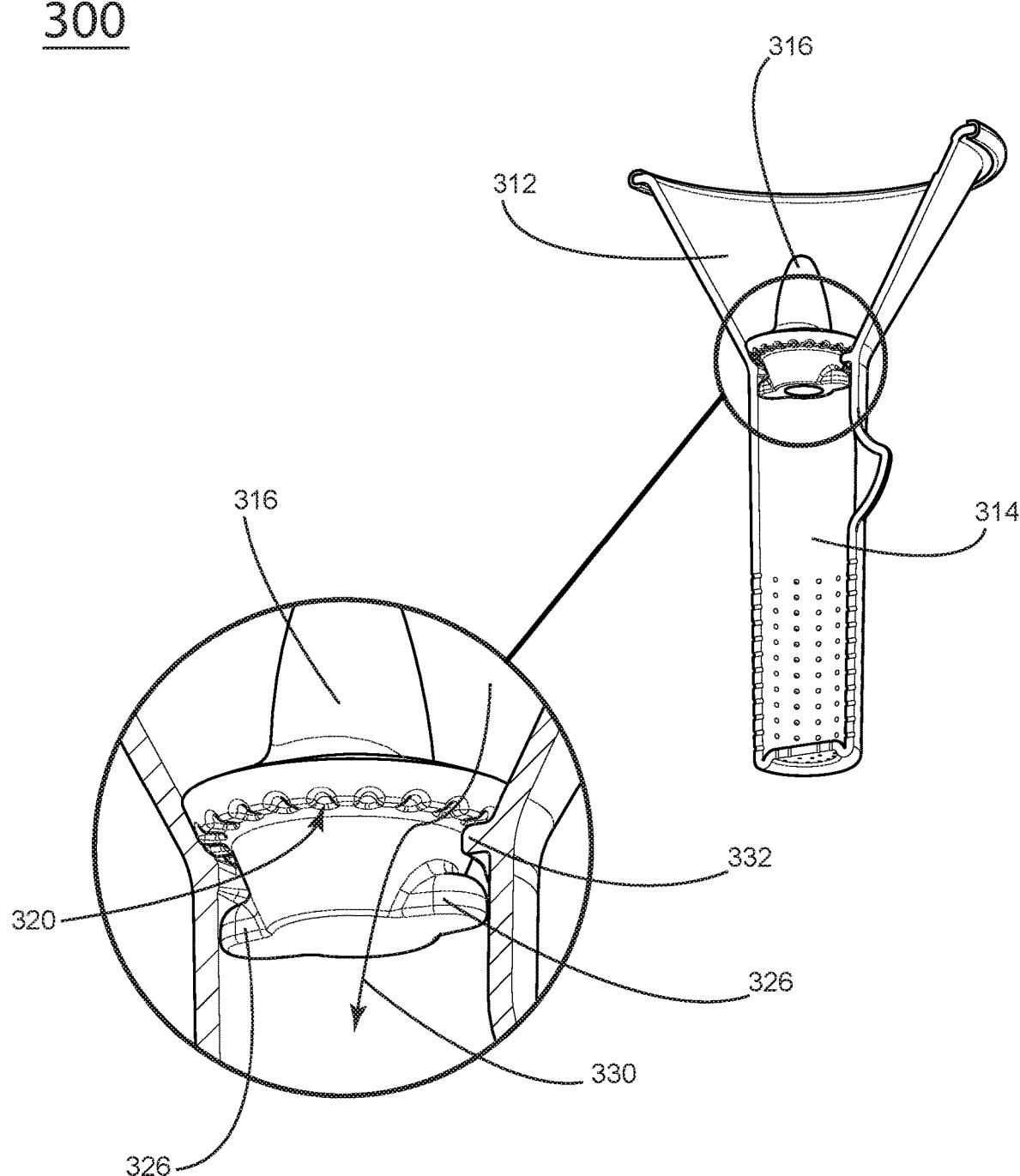
FIG. 11 is a detailed perspective view of the embodiment of FIG. 6 showing the flow through the lid.

A lid 316 (FIG. 6) is removably engaged between the frusto-conical section 312 and the cylindrical portion 314. The lid has at least one protrusion 326 that engages the lid with a flange in the cylindrical portion 332 (FIGS. 9, 10, 11). One skilled in the art is familiar with the manner in which a common tea pot lid engages with an annular flange about the opening in a tea pot.

Most commonly, a lid has two protrusions: one of which is inserted under a flange at the top of a vessel, and a second which fits through a notch in a flange. A lid is rotated at least ¼ turn to engage the protrusions with the flange so that the lid does not slip out during use. A lid of this type is removed in the reverse order of operations.

In some embodiments a rubber gasket 324 (FIG. 6) is affixed to the upper edge of the frusto-conical section 312 to provide a cushion between the carafe 310 and the filter 300.

Two section views are depicted in FIGS. 9 and 10. The section view of FIG. 9 shows the protrusion 322 fitting through the spout 311 of the carafe 310. The protrusion is of a dimension that allows it to pass through the spout when inserted along the direction of arrow 328. FIG. 10 shows the protrusion 322 resting in the carafe after the filter 300 has been inserted and rotated 90° about the vertical center of the filter 300 and carafe 310. It can be seen in the illustration that the filter 300 will not fall out of the carafe 310 upon tipping as the protrusion 322 would interfere with the side walls of the carafe 310. It can be seen from the section views of FIGS. 9 and 10 that protrusions 326 in the lid 316 keep the lid in place when the carafe 310 is tipped to pour, because the protrusions 326 are held in place by the flange 332 residing between the frusto-conical portion 312 and the cylindrical portion 314 of the filter 300.

In FIG. 11 a detailed, partial section view shows the relationship between grooves 320 and the flange 332. The lid 316 with protrusions 326 is fitted about the flange 332 as previously described. Grooves 320 are arrayed annularly about the lid in the region where the lid comes into contact with the flange 332. The grooves 320 are sized so as to allow water to flow from the frusto-conical section 312 into the cylindrical portion 314 as illustrated by arrow 330. These grooves 320 are sized to allow water to pass through while keeping granular charcoal contained in the cylindrical portion 314. In some embodiments the grooves are semi-cylindrical openings having a 0.5 mm-2 mm radius and preferably a 0.75 mm radius. Granular charcoal commonly used for filtration has a granular size of 2 mm or larger.

The invention claimed is:

1. An apparatus for filtering water comprising:
   a frusto-conical hollow section providing a reservoir having an open top and an open bottom; and
   an annular flange about the open bottom of said frusto-conical hollow section, and the open bottom fixedly engaged with a cylindrical filter body; and
   the cylindrical filter body having a cylindrical sidewall, a bottom surface and an open top; and
   said cylindrical filter body's open top in fluid communication with said reservoir and fixedly engaged with the open bottom of said frusto-conical hollow section; and
   at least a portion of the cylindrical sidewall and bottom surface of the cylindrical filter body having perforations; and
   the apparatus fitting into a provided hourglass-shaped carafe;
   wherein activated carbon placed in the cylindrical filter body provides a filter medium for filtering water that is poured into said reservoir and thus flows through said open bottom of said reservoir, into said open top of said cylindrical filter body and through the filter medium and out of said perforations in said cylindrical filter body's cylindrical sidewall and bottom surface, and into said provided hourglass-shaped carafe; and
   a protrusion-and-receptacle mechanism comprising:
      a protrusion engaged with said cylindrical filter body;
      side cross-section of the protrusion extending tangentially and arcuately downward and away from the cylindrical sidewall forming a downward arcuate curve; and turning arcuately back toward the cylindrical sidewall; and meeting the cylindrical sidewall substantially perpendicularly; and
      said provided hourglass-shaped carafe with integrated spout and a throat at the narrowest portion of the provided hourglass-shaped carafe;
      wherein the protrusion fits within the integrated spout of said provided hourglass-shaped carafe, and when said protrusion is rotated away from the integrated spout of said provided hourglass-shaped carafe, the downward arcuate curve follows the contour of the shape of the provided hourglass-shaped carafe while interfering with the throat of the provided hourglass-shaped carafe such that the apparatus for filtering water remains seated in the provided hourglass-shaped carafe while the provided hourglass-shaped carafe is tilted from a vertical position to a canted position at which the provided hourglass-shaped carafe is rotated by 90 degrees or more relative to the vertical position.

2. An apparatus for filtering water comprising:
a frusto-conical hollow section providing a reservoir having an open top and an open bottom; and
an annular flange about the open bottom of said frusto-conical hollow section, and the open bottom fixedly engaged with a cylindrical filter body; and
the cylindrical filter body having a cylindrical sidewall, a bottom surface and an open top; and
said cylindrical filter body's open top in fluid communication with said reservoir and fixedly engaged with the open bottom of said frusto-conical hollow section; and
at least a portion of the cylindrical sidewall and bottom surface of the cylindrical filter body having perforations; and
the apparatus fitting into a provided hourglass-shaped carafe;
wherein activated carbon placed in the cylindrical filter body provides a filter medium for filtering water that is poured into said reservoir and thus flows through said open bottom of said reservoir, into said open top of said cylindrical filter body and through the filter medium and out of said perforations in said cylindrical filter body's cylindrical sidewall and bottom surface, and into said provided hourglass-shaped carafe; and
a lid, the lid comprising:
  a frusto-conical section having a wide top end and a narrow bottom end; and
  a handle fixedly engaged with the wide top end; and
  grooves arrayed annularly about the narrow bottom end, providing a crenelated surface; and
  a cylindrical portion extending downward from said narrow bottom end; and
  at least one radial protrusion extending radially from said cylindrical portion;
  wherein said crenelated surface removably engaged with said annular flange about the open bottom of said frusto-conical hollow section, and the frusto-conical hollow section fits within the reservoir and the crenelated surface removably engages against said annular flange, and water flows horizontally through openings created by said crenelated surface, then downward into said cylindrical filter body.

3. An apparatus for filtering water comprising:
a frusto-conical hollow section providing a reservoir having an open top and an open bottom; and
an annular flange about the open bottom of said frusto-conical hollow section, and the open bottom fixedly engaged with a cylindrical filter body; and
the cylindrical filter body having a cylindrical sidewall, a bottom surface and an open top; and
said cylindrical filter body's open top in fluid communication with said reservoir and fixedly engaged with the open bottom of said frusto-conical hollow section; and
at least a portion of the cylindrical sidewall and bottom surface of the cylindrical filter body having perforations; and
the apparatus fitting into a provided hourglass-shaped carafe;
wherein activated carbon placed in the cylindrical filter body provides a filter medium for filtering water that is poured into said reservoir and thus flows through said open bottom of said reservoir, into said open top of said cylindrical filter body and through the filter medium and out of said perforations in said cylindrical filter body's cylindrical sidewall and bottom surface, and into said provided hourglass-shaped carafe; and
said annular flange disposed toward the center of the frusto-conical hollow section; and
said annular flange occupying between 5 degrees and 60 degrees less than 360 degrees of the open bottom of said frusto-conical hollow section, providing an opening in the annular flange;
wherein a protrusion on a lid configured to pass through said opening in the annular flange may be rotated while residing under the annular flange to prevent the lid from moving upward unless rotated to align the protrusion with the opening in the annular flange.

* * * * *